A. SMITH, Jr.
EXPANSION ANCHOR.
APPLICATION FILED MAR. 8, 1916.
1,199,624.
Patented Sept. 26, 1916.
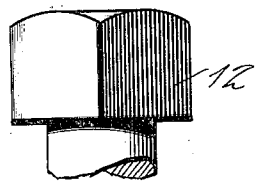
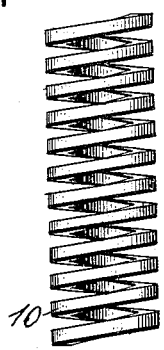
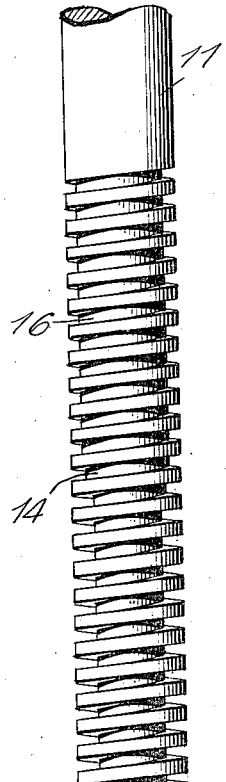
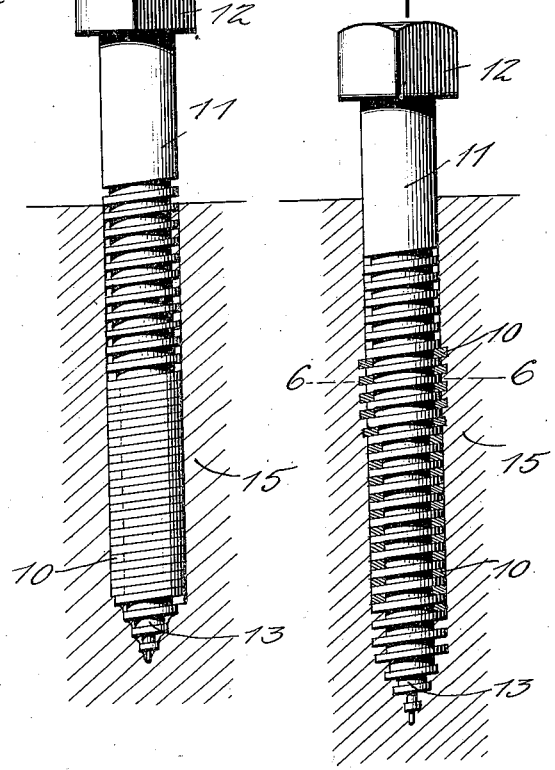
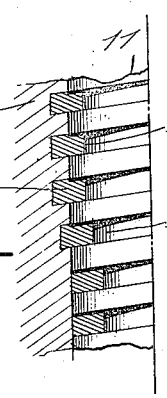
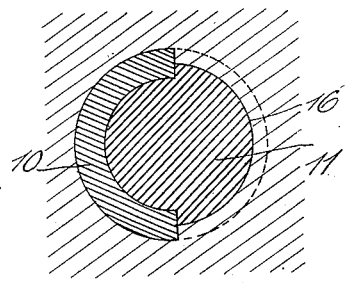
WITNESSES:
INVENTOR
ALLEN SMITH, JR.,
BY
ATTORNEYS

UNITED STATES PATENT OFFICE.

ALLEN SMITH, JR., OF FORT GEORGE WRIGHT, WASHINGTON.

EXPANSION-ANCHOR.

1,199,624.  Specification of Letters Patent. Patented Sept. 26, 1916.

Application filed March 8, 1916. Serial No. 82,955.

*To all whom it may concern:*

Be it known that I, ALLEN SMITH, Jr., a citizen of the United States, and a resident of Fort George Wright, in the county of Spokane and State of Washington, have invented a certain new and useful Improvement in Expansion-Anchors, of which the following is a specification.

My present invention relates generally to expansion anchors, and more particularly to anchoring devices to be utilized in connection with wood and other soft material, my object being to provide a simple inexpensive anchor, including a member which, when once secured in position, will remain, and a threaded member for seating the first member which may be either designed solely for this purpose or in the form of a screw constructed to coöperate therewith.

A further object of my invention is to provide an anchor of the above type, including an expansion sleeve and a threaded member, the coöperating structures of which are such as to permit of the reception of the former in connection with the latter, and wholly within the outside diameter thereof.

A still further object of my invention is to provide a threaded member and an expansion sleeve which, when properly adjusted, may be partly hammered or driven into a soft material, whereby to render the operation of fitting the threaded member peculiarly speedy and effective.

Other objects, and the advantages resulting from my present invention, will be readily understood by reference to the accompanying drawings, forming a part of this specification, and wherein—

Figure 1 is an elevation of one part of the anchor, namely, the threaded member. Fig. 2 is a similar view of the sleeve. Fig. 3 is a sectional elevation illustrating the sleeve and threaded member properly adjusted and partly hammered home. Fig. 4 is a similar view illustrating the operation of the threaded member to expand and seat the sleeve in position. Fig. 5 is an enlarged sectional view through one side of the seated portion of the sleeve as shown in Fig. 4. Fig. 6 is a detail cross section taken substantially on line 6—6 of Fig. 4.

Referring now to these figures, and particularly to Fig. 2, it will be seen that I provide a sleeve constituting part of my expansion anchor, in the form of a helical coil 10, of uniform inner and outer diameter throughout its entire length, the spacing of the several convolutions of the coil being also uniform throughout.

As seen in Fig. 1, the threaded member 11 which may be of the general form of a wood screw, with an outer head 12 and an inner tapering end 13, has its stem somewhat abruptly enlarged at 14 at a point intermediate its ends and substantially centrally of its threaded area, it being noted that the outside diameter of the threaded portion of member 11 is uniform throughout and is substantially the same as that of the sleeve as seen by reference to Fig. 3.

Referring again to Fig 1, it will be noted that the smaller inner portion of the stem of threaded member 11 at the inner side of the enlargement 14, is of a uniform diameter substantially the same as the inner diameter of the sleeve 10 and is of a length exceeding that of the sleeve. Thus, as the threads of the member 11 form between them a helical channel adapted for the reception of the coils of the sleeve 10, the said sleeve may be adjusted in connection with the smaller portion of the stem of the threaded member to lie wholly within the outside limits of the threads of said member 11, as shown in Fig. 3, permitting the two parts of the anchor, so associated, to be partly hammered or driven into material such as wood, and as indicated at 15 in Figs. 3 to 6 inclusive.

When so driven into the wood, the inner end of the coil of the sleeve 10 prevents rotation of the sleeve, and thus when the threaded member 11 is rotated by engagement of a suitable implement with its outer threaded end 12, it feeds through the sleeve and, by virtue of its enlarged upper portion which latter, as seen at 16, is of a uniform diameter greater than the inside diameter of the sleeve 10, a portion of the sleeve at least is expanded outwardly into engagement, and partly embedded within, the wall of the opening formed by driving the threaded member and sleeve into the material as just above described in connection with Fig. 3. Thus, as shown in Fig. 4, by the proper utilization of the coacting parts of the anchor, the sleeve is firmly and permanently associated with the bore of the screw opening and forms a metallic thread in connection with which the threaded member 11 may be turned inwardly or outwardly to and from secured position.

It will thus be seen that my invention provides an expansion anchor of great holding power, the threads of which cannot be readily stripped, which may be readily and quickly placed, and which will enable the use of a metal thread of different material than that of the threaded member itself. It will be furthermore seen that my invention, in addition to its operating advantages, is simple, inexpensive, and durable.

I claim:—

1. An expansion anchor comprising the combination of an expansion sleeve consisting of a helical coil of uniform inner and outer diameters throughout its length, and the convolutions of which are uniformly spaced, and a threaded member, the outside diameter of which is substantially the same as that of the sleeve and the stem of which is abruptly enlarged intermediate its ends and at a point substantially centrally of its threaded area, and having a helical channel between its threads adapted to receive the coils of said sleeve, the smaller portion of said stem being of a uniform diameter substantially the same as the inner diameter of the sleeve and of a length exceeding that of the sleeve, and the enlarged portion of said stem being of a diameter greater than the said inner diameter of the sleeve, all for the purpose described.

2. An expansion anchor comprising the combination of an expansion sleeve consisting of a helical coil of uniform inner and outer diameters throughout its length, and a threaded member which has a helical channel between its threads which is lessened in depth intermediate its ends, and has a portion of uniform depth substantially equal to, and another portion of uniform depth less than, the difference between the inner and outer diameters of the sleeve.

3. An expansion anchor comprising the combination of an expansion sleeve consisting of a helical coil of uniform inner and outer diameters throughout its length, and the convolutions of which are uniformly spaced, and a threaded member the outside diameter of which is substantially the same as that of the sleeve and having a helical channel between its threads adapted to receive the coils of said sleeve, said helical channel being abruptly lessened in depth intermediate its ends and at a point substantially centrally of its threaded area, one portion having a uniform depth less than the difference between the inner and outer diameters of the sleeve.

ALLEN SMITH, Jr.

Witnesses:
O. C. MOORE,
CHAS. T. SMITH.